(12) United States Patent
Liu et al.

(10) Patent No.: US 8,775,687 B1
(45) Date of Patent: Jul. 8, 2014

(54) METHOD TO ENSURE DATA COHERENCY IN A SCALABLE AGGREGATE NEIGHBOR-DEVICE INTERFACE

(71) Applicant: LSI Corporation, San Jose, CA (US)

(72) Inventors: Yang Liu, Milpitas, CA (US); Nital Patwa, San Jose, CA (US); Changyou Xu, Fremont, CA (US); Timothy Canepa, Los Gatos, CA (US); Chien Chen, Fremont, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/917,299

(22) Filed: Jun. 13, 2013

Related U.S. Application Data

(60) Provisional application No. 61/812,103, filed on Apr. 15, 2013.

(51) Int. Cl.
*G06F 3/06* (2006.01)
*G06F 13/12* (2006.01)

(52) U.S. Cl.
USPC ............ 710/5; 710/2; 710/8; 710/11; 710/14; 710/15

(58) Field of Classification Search
None
See application file for complete search history.

(56) References Cited

U.S. PATENT DOCUMENTS

| | | | |
|---|---|---|---|
| 7,685,352 B2 | 3/2010 | Gregg et al. | |
| 7,849,242 B2 * | 12/2010 | Lee et al. | ........................ 710/74 |
| 2011/0296129 A1 | 12/2011 | Arai et al. | |
| 2012/0066435 A1 | 3/2012 | Colgrove et al. | |
| 2012/0066447 A1 | 3/2012 | Colgrove et al. | |

* cited by examiner

*Primary Examiner* — Scott Sun
(74) *Attorney, Agent, or Firm* — Suiter Swantz pc llo

(57) ABSTRACT

A method for processing a read sub-command in a secondary storage controller is disclosed. The method includes receiving the read sub-command from a primary storage controller; retrieving data in response to the read sub-command; utilizing a write request to write the retrieved data directly to a memory accessible by a host device; issuing an additional request to the same memory after the write request; receiving an indication of completion of the additional request; and reporting a sub-completion status to the primary storage controller.

20 Claims, 3 Drawing Sheets

METHOD TO ENSURE DATA COHERENCY IN A SCALABLE AGGREGATE NEIGHBOR-DEVICE INTERFACE

CROSS-REFERENCE TO RELATED APPLICATIONS

The present application claims the benefit under 35 U.S.C. §119(e) of U.S. Provisional Application Ser. No. 61/812,103, filed Apr. 15, 2013. Said U.S. Provisional Application Ser. No. 61/812,103 is hereby incorporated by reference in its entirety.

TECHNICAL FIELD

The present invention relates to the field of storage controller and particularly to providing data coherency when multiple storage controllers are used.

BACKGROUND

A solid state drive (SSD) is a data storage device using integrated circuit assemblies as memory to store data persistently. SSD technology uses electronic interfaces compatible with traditional block input/output (I/O) hard disk drives. Redundant array of independent disks (RAID) is a storage technology that utilizes a plurality of storage devices.

SUMMARY

Accordingly, an embodiment of the present disclosure is directed to a method for processing a read sub-command in a secondary storage controller. The method includes receiving the read sub-command from a primary storage controller; retrieving data in response to the read sub-command; utilizing a write request to write the retrieved data directly to a memory accessible by a host device; issuing an additional request to the same memory after the write request; receiving an indication of completion of the additional request, further indicating completion of the write request utilized to write the retrieved data directly to the memory accessible by the host device; and reporting a sub-completion status to the primary storage controller.

A further embodiment of the present disclosure is directed to a storage apparatus having multiple storage devices and storage controllers for controlling the storage devices. One of the storage controllers is configured as a primary storage controller and the rest of the storage controllers are configured as secondary storage controllers. The primary storage controller is configured for accepting a host device initiated command and generating a sub-command for one or more of the secondary storage controllers. The secondary storage controller is configured for: receiving the sub-command from the primary storage controller; determining whether the sub-command is a read sub-command or a write sub-command; retrieving data in response to the read sub-command; utilizing a write request to write the retrieved data directly to a memory accessible by the host device; issuing an additional request to the same memory after the write request, further indicating completion of the write request utilized to write the retrieved data directly to the memory accessible by the host device; receiving an indication of completion of the additional request; and reporting a sub-completion status to the primary storage controller.

Additionally, the primary storage controller is configured for: collecting the sub-completion status from each of the secondary storage controllers; and reporting an aggregated completion status to the host device when the sub-completion status from each of the secondary storage controllers is received.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Scalable aggregate neighbor-device interface is an interface/protocol that allows multiple Solid State Drives (SSDs) to cooperatively behave as a single device to a host device. Such an interface is described in: Scalable Storage Devices, Timothy Canepa et al., PCT Application No. PCT/US2011/040996, which is herein incorporated by reference in its entirety.

Figure 1:
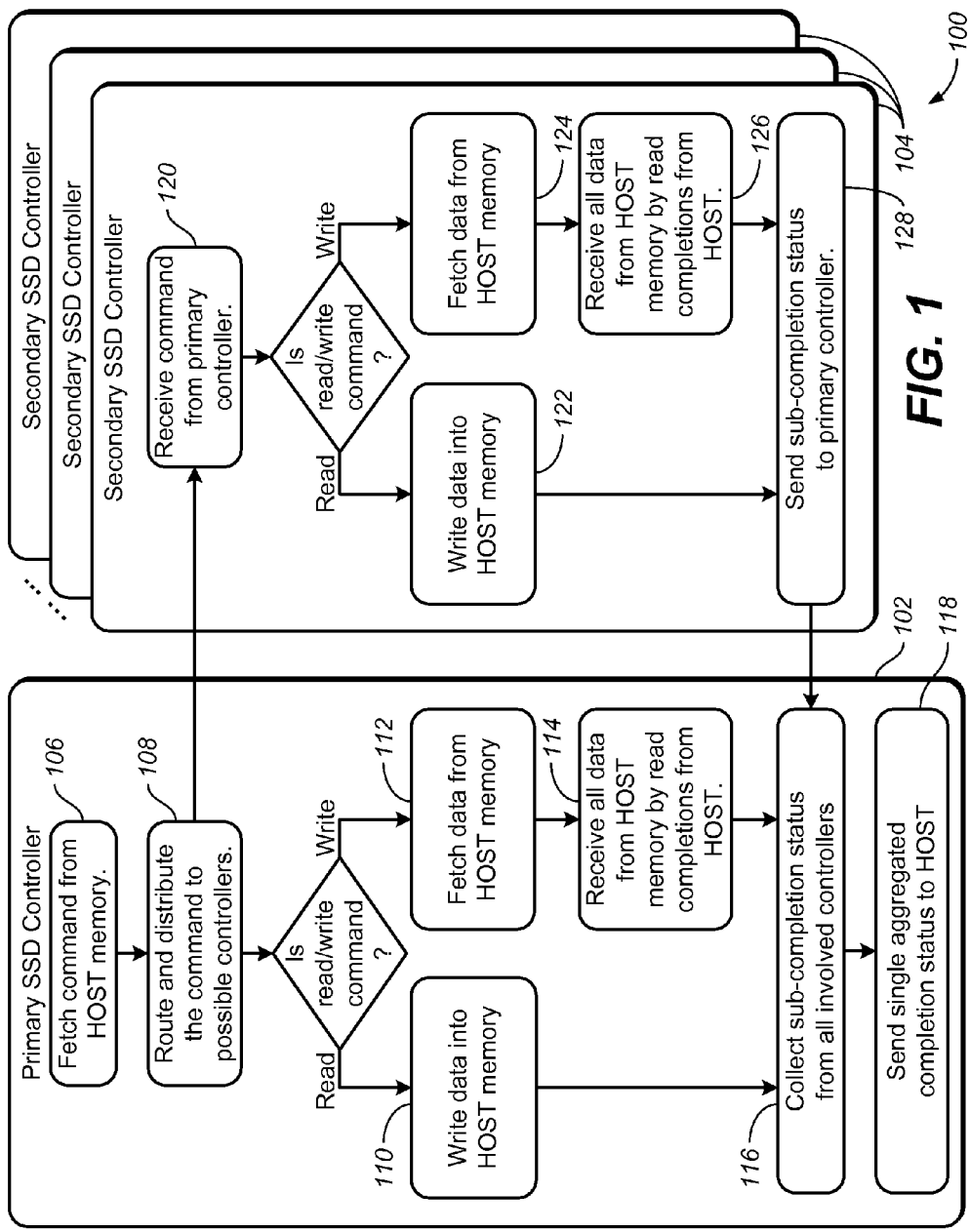
FIG. 1 is a block diagram illustrating operations of SSD controllers in a system that implements a scalable aggregate neighbor-device interface.

FIG. 1 is a block diagram illustrating operations of SSD controllers in a system 100 that implements a scalable aggregate neighbor-device interface. As shown in FIG. 1, one of the SSD controllers is designated as the primary controller 102 and the rest of the SSD controllers are all designated as secondary controllers 104. All controllers 102 and 104 can communicate with the host device for data transfers between SSD storage and host memory through a high-speed bus. However, for the multiple solid state drives to cooperatively behave as a single device to the host device, the host device only sends command to the primary controller 102, and a completion status is only transferred to the host device from the primary controller 102.

More specifically, when the primary controller 102 receives a command issued by the host device in step 106, the primary controller 102 can determine which secondary controllers 104 should be involved in order to handle the command based on the Logical Block Addressing (LBA) and the length contained in the request command. The primary controller 102 then distributes the command to these secondary controllers in step 108 for further processing.

If the primary controller 102 itself is responsible for at least a portion of the data requested, the primary controller 102 is configured to handle that portion of the data accordingly. For instance, if the command received from the host is a read request, the primary controller 102 should retrieve that portion of the data and write the retrieved data into the host memory using one or more writes to the host memory, as indicated in step 110. On the other hand, if the command received from the host is a write request, the primary controller 102 should fetch the data from the host memory using one or more reads as indicated in step 112. The primary controller 102 then receives read completions from the host in step 114 and subsequently completes the portion of the data request the primary controller 102 is responsible for. However, before sending a completion signal to the host device as indicated in step 118, the primary controller 102 needs to wait and collect sub-completion statuses in step 116 from all the secondary controllers 104 that are involved in handling their portions of the data request.

For the each secondary controller 104 that is involved in handling a portion of the data request, instead of receiving the command from the host device directly, a sub-command is received from the primary controller 102 in step 120. Each secondary controller 104 then translates LBA and/or length to local LBA(s) and/or length if necessary and processes the sub-command in a similar manner as described above. More specifically, if the sub-command received is a read request, the secondary controller 104 should retrieve that portion of the data and write the retrieved data directly into the host memory using one or more writes to the host memory, as indicated in step 122. On the other hand, if the sub-command received is a write request, the secondary controller 104 should fetch the data directly from the host memory using one or more reads as indicated in step 124. The secondary controller 104 then receives read completions from the host in step 126 and subsequently completes the portion of the data request that secondary controller 104 is responsible for. Upon completion of the sub-command, a sub-completion status is returned to the primary controller 102 in step 128. Once the primary controller 102 receives all sub-completion statuses back from the secondary controllers participating in the request, the primary controller 102 sends a single completion back to the host device in step 118.

Peripheral Component Interconnect Express (PCI Express or PCIe) is a high-speed serial bus standard commonly utilized in computer systems. The PCIe transaction layer provides a variety of different packet types to carry information from a transmitting component to a receiving component. These Transaction Layer Packets are used to communication transactions such as read, write and events. For instance, a posted transaction is a transaction where the requester does not expect to and will not receive a completion packet. A non-posted transaction, on the other hand, is a transaction where the requester does require and expect to receive a completion packet from the device completing the request. According to PCIe standard, PCIe memory write operations are performed using posted requests while PCIe memory read operations are performed using non-posted requests.

In addition to the different types of transactions, PCIe standard also imposes ordering rules on transactions flowing through the system. For example, according to PCIe ordering rules, a PCIe read without IDO set (ID based Ordering) is not allowed to pass a PCIe write. In addition, a PCIe write to a target is also not allowed to bypass a previous write to that same target. It is understood that the ordering rules referenced above are merely exemplary. Various other ordering rules imposed by PCIe are not reiterated in the present disclosure.

Referring to FIG. 1, when PCIe is utilized to perform data transfer between the SSD controllers and the host memory, writing data from a controller into the host memory (i.e., steps 110 and/or 122) is performed by using one or more PCIe writes to push the data into the host memory. However, because PCIe writes are posted transactions (i.e., no confirmation back from final destination), certain data coherency problems may arise under certain PCIe topologies. For instance, after a secondary controller 104 sends all the PCIe memory writes to the host device (for processing a host read command) in step 122, the controller 104 subsequently sends the sub-completion to the primary controller 102 to indicate it has finished the command on its side in step 128. However, because the destination of this sub-completion is the primary controller 102 instead of the host, neither the secondary controller 104 nor the primary controller 102 has any confirmation regarding whether the PCIe memory writes to the host device sent in step 122 have actually been completed. Therefore, even after the primary controller 102 receives all sub-completion from all involved secondary controllers 104, the primary controller 102 still does not know whether all the data has been successfully moved from SSD storage to the host memory, and in certain situations, the primary controller 102 can report completion status to the host before the PCIe memory writes from the secondary SSDs to the host device have actually been completed.

It is noted that such data coherency problems only occur for host read commands when PCIe is utilized to perform data transfer between the controllers and the host. Host write commands do not have this problem because the controllers use non-posted PCIe reads in step 124 and confirmations are required before sending the sub-completions to the primary controller 102.

Figure 2:
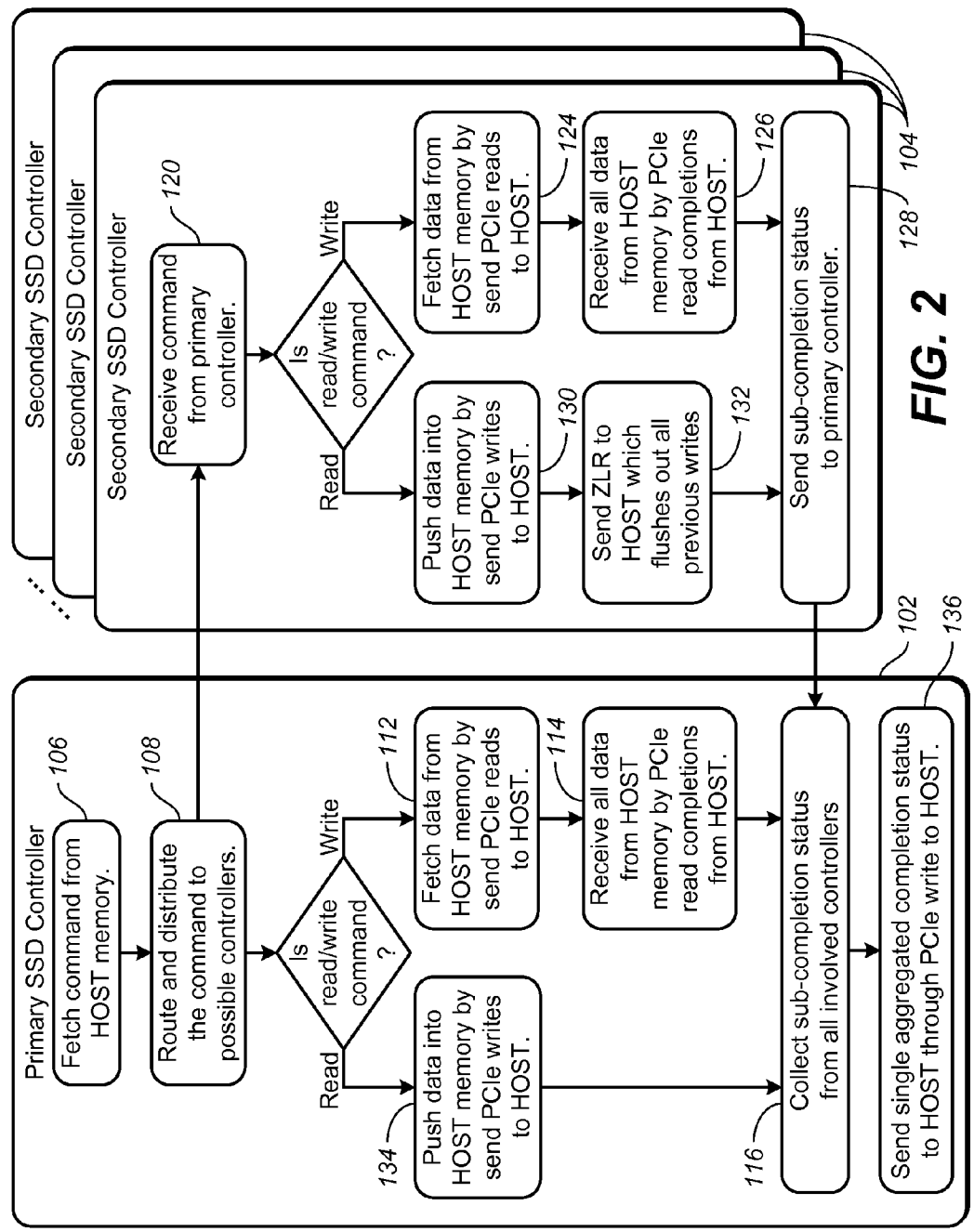
FIG. 2 is a block diagram illustrating operations of SSD controllers that utilize additional read requests to ensure data coherency in a system that implements a scalable aggregate neighbor-device interface.

Embodiments of the present disclosure address the data coherency problems that may occur for host read commands when PCIe is utilized to perform data transfer between the SSD controllers and the host memory. More specifically, writing data from a secondary controller 104 to the host device is implemented as a two step process in accordance with an embodiment of the present disclosure. As illustrated in FIG. 2, after a secondary controller 104 sends one or more PCIe memory writes to the host device (in response to a host read command) in step 130, the controller 104 subsequently sends a non-posted dummy request to the host in step 132. Doing so requires the controller 104 to wait for a completion back from the host in response to the non-posted dummy request, which guarantees the completion of the previous PCIe memory writes this controller 104 just sent to the host device in step 130 due to PCIe ordering rules. In this manner, the controller 104 does not automatically send the sub-completion to the primary controller 102 upon completion of step 130. Instead, the controller 104 waits for the completion in step 132 and only sends the sub-completion to the primary controller 102 after the completion is received.

It is noted that sending the non-posted dummy request from the secondary controller 104 to the host in step 132 ensures data coherency by taking advantages of PCIe ordering rules. More specifically, the non-posted dummy request sent to the host in step 132 is not allowed to pass any of the writes sent from that same secondary controller 104 to the host in step 130 because they have the same destination (i.e., the host memory). It is also noted that data coherency is ensured whether the secondary controller 104 sends a single PCIe write or multiple PCIe writes in step 130. In either case, the secondary controller 104 only needs to send one non-posted dummy request in step 132 to guarantee completion of any and all PCIe writes sent in step 130 prior to completion of the non-posted dummy request sent in step 132 due to PCIe ordering rules.

It is also noted that the primary controller 102 does not need to send a non-posted dummy request after sending PCIe writes to the host in step 134. This implementation also takes advantages of PCIe ordering rules because a PCIe write to a target is not allowed to bypass a previous write to that same target. Since sending the completion status to the host is implemented using a PCIe write to the host in step 136, this PCIe write (i.e., step 136) is not allowed to bypass any previous writes to the host, which ensures completion of any and all PCIe writes issued in step 134 prior to completion of the PCIe write issued in step 136, which in turn ensures data coherency.

In various embodiments, a non-posted dummy request is implemented in the form of a Zero-Length Read (ZLR) request. In a PCIe system, ZLR is a dummy memory read request with no bytes enabled. A ZLR request can therefore be used by devices as a type of flush request. In some embodiments the coherency of the write can be ensured by a ZLR to a PCIe root complex device connected to the memory targeted by the write. In other embodiments a read of the same location as the last data write is required to ensure coherency. In still further embodiments, coherency of PCIe writes involving more than one host read operation can be satisfied by a single read request following the write requests. Essentially one ZLR (or read) request can be used to guarantee the coherency of N writes for M host read operations where N>M and M≥1. It is contemplated that the non-posted dummy request is not limited to a ZLR request. Various other types of non-posted requests may be utilized as the dummy request without departing from the spirit and scope of the present disclosure.

Figure 3:
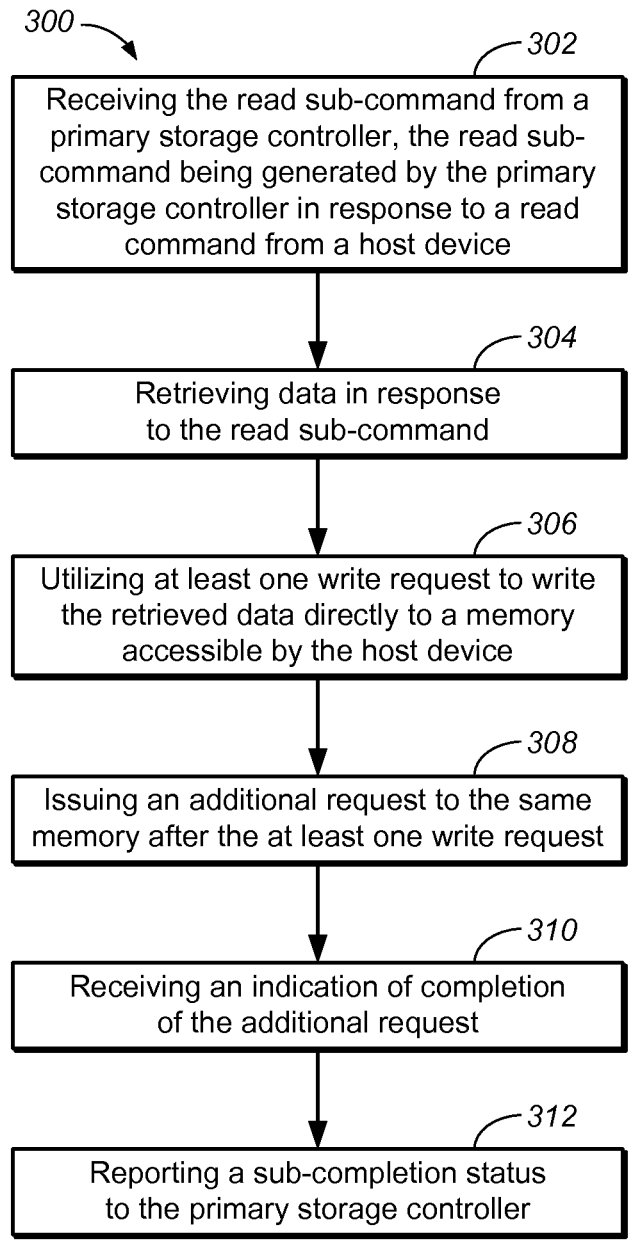
FIG. 3 is a flow diagram illustrating a method for processing a read sub-command.

Referring to FIG. 3, a flow diagram illustrating a method 300 for processing a read sub-command in a secondary controller is shown. In accordance with one embodiment of the present disclosure, a host device initiated command is received at a primary storage controller, which in turn generates one or more sub-commands for one or more secondary storage controllers. Each secondary storage controller, upon receiving such a sub-command from the primary storage controller in step 302, determines whether the sub-command is a read sub-command or a write sub-command.

If the sub-command received is a read sub-command, the secondary controller retrieves the portion of the data requested in step 304 and pushes the retrieved data directly into the host memory using one or more PCIe writes to the host memory in step 306. The secondary controller subsequently issues an additional request to the same memory in step 308, waits for a completion back from the host in step 310, and reports a sub-completion status to the primary storage controller in step 312 once the completion is received. It is noted that the additional request issued in step 308 describe above is not necessary for host write sub-commands.

It is contemplated that the memory in question may be attached to a PCIe root complex and accessible to the host through the root complex. In such a PCIe system, the secondary controller can issue the additional request (i.e., the non-posted dummy request) to the root complex that the memory is attached to without departing from the spirit and scope of the present disclosure.

It is also contemplated that the storage controllers referenced above are not limited to SSD controllers. The method and system in accordance with an embodiment of the present disclosure is applicable to various types of storage controllers without departing from the spirit and scope of the present disclosure. It is also contemplated that the term storage devices may refer to either logical and/or physical storage devices, and the term host device may refer to various devices capable of sending read/write commands to the storage devices. It is understood that such devices may be referred to as hosts, initiators, requesters or the like without departing from the spirit and scope of the present disclosure.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for processing read sub-command, the method comprising:
   receiving at least one read sub-command from a primary storage controller, the at least one read sub-command being generated by the primary storage controller in response to a read command from a host device;
   retrieving data in response to each of the at least one read sub-command;
   utilizing at least one write request to write the retrieved data directly to a memory accessible by the host device;
   issuing an additional request to the same memory after the at least one write request;
   receiving an indication of completion of the additional request; and
   reporting a sub-completion status to the primary storage controller.

2. The method of claim 1, wherein each of the at least one write request is a Peripheral Component Interconnect Express (PCIe) write request to the memory accessible by the host device.

3. The method of claim 2, wherein the additional request issued to the same memory after the at least one write request is a non-posted PCIe request.

4. The method of claim 3, wherein the non-posted PCIe request is a PCIe read request.

5. The method of claim 3, wherein the non-posted PCIe request is a zero-length read request.

6. The method of claim 2, wherein the memory accessible by the host device is accessible through a PCIe root complex, and wherein the additional request is issued to the PCIe root complex.

7. A storage apparatus, comprising:
   a plurality of storage devices; and
   a plurality of storage controllers configured for controlling the plurality of storage devices;

wherein one of the plurality of storage controllers is configured as a primary storage controller and the rest of the plurality of storage controllers are configured as secondary storage controllers;

wherein the primary storage controller is configured for accepting a host device initiated command and generating a sub-command for at least one of the secondary storage controllers; and wherein the at least one of the secondary storage controller is configured for:
  receiving the sub-command from the primary storage controller;
  determining whether the sub-command is a read sub-command or a write sub-command;
  retrieving data in response to the read sub-command;
  utilizing at least one write request to write the retrieved data directly to a memory accessible by the host device;
  issuing an additional request to the same memory after the at least one write request;
  receiving an indication of completion of the additional request; and
  reporting a sub-completion status to the primary storage controller.

8. The storage apparatus of claim 7, wherein each of the plurality of storage controllers implements a Peripheral Component Interconnect Express (PCIe) communication protocol.

9. The storage apparatus of claim 8, wherein each of the at least one write request is a PCIe write request to the memory accessible by the host device.

10. The storage apparatus of claim 8, wherein the additional request issued to the same memory after the at least one write request is a non-posted PCIe request.

11. The storage apparatus of claim 9, wherein the non-posted PCIe request is a PCIe read request or a zero-length read request.

12. The storage apparatus of claim 8, wherein the memory accessible by the host device is accessible through a PCIe root complex, and wherein the additional request is issued to the PCIe root complex.

13. The storage apparatus of claim 7, wherein each of the plurality of storage devices includes a solid state drive.

14. A method for processing a host device initiated command, the method comprising:

accepting a host device initiated command at a primary storage controller;

generating a sub-command for at least one secondary storage controller;

processing the sub-command utilizing said at least one secondary storage controller, further comprising:
  determining whether the sub-command is a read sub-command or a write sub-command;
  retrieving data in response to the read sub-command;
  utilizing at least one write request to write the retrieved data directly to a memory accessible by the host device;
  issuing an additional request to the same memory after the at least one write request;
  receiving an indication of completion of the additional request; and
  reporting a sub-completion status to the primary storage controller;

collecting the sub-completion status from each of said at least one secondary storage controller; and reporting an aggregated completion status to the host device when the sub-completion status from each of said at least one secondary storage controller is received.

15. The method of claim 14, wherein each of the primary storage controller and the at least one secondary storage controller implements a Peripheral Component Interconnect Express (PCIe) communication protocol.

16. The method of claim 15, wherein each of the at least one write request is a PCIe write request to the memory accessible by the host device.

17. The method of claim 15, wherein the additional request issued to the same memory after the at least one write request is a non-posted PCIe request.

18. The method of claim 17, wherein the non-posted PCIe request is a PCIe read request or a zero-length read request.

19. The method of claim 15, wherein the memory accessible by the host device is accessible through a PCIe root complex, and wherein the additional request is issued to the PCIe root complex.

20. The method of claim 14, wherein each of the plurality of storage devices includes a logical storage device or a physical storage device.

* * * * *